United States Patent [19]

Steel et al.

[11] 4,249,415
[45] Feb. 10, 1981

[54] APPARATUS FOR MEASUREMENT OF COMPRESSIVE LOADS

[75] Inventors: Gordon H. Steel, Warwick; Graham Mitchell, Nuneaton, both of England

[73] Assignee: Brico Engineering, Co., Ltd., Coventry, England

[21] Appl. No.: 37,177

[22] Filed: May 8, 1979

[30] Foreign Application Priority Data

May 26, 1978 [GB] United Kingdom .............. 23360/78

[51] Int. Cl.³ ........................................ G01M 15/00
[52] U.S. Cl. .................................................... 73/120
[58] Field of Search ......................... 73/120, 790, 818

[56] References Cited

U.S. PATENT DOCUMENTS

| | | | |
|---|---|---|---|
| 1,439,469 | 12/1922 | Hapgood | 73/120 |
| 1,760,518 | 5/1930 | Okochi et al. | 73/120 |
| 1,933,354 | 10/1933 | Teetor | 73/120 |
| 3,834,228 | 9/1974 | Wachholz | 73/818 |

Primary Examiner—James J. Gill
Attorney, Agent, or Firm—Mawhinney & Mawhinney & Connors

[57] ABSTRACT

Apparatus is disclosed for measuring compressive loads and more specifically for measuring the "diametral load to close", of a gapped piston ring or sealing ring. The ring is mounted in a vertical plane so that the diameter through its gap is substantially horizontal. At the opposite ends of the vertical diameter, the ring is supported by, and makes contact with, upper and lower slide members which are movable towards and away from each other in a vertical direction. The lower slide rests on a load cell. A compressive load may be applied to the piston ring through the upper slide so as to close the piston ring gap, and the compressive load is registered by the load cell.

4 Claims, 4 Drawing Figures

APPARATUS FOR MEASUREMENT OF COMPRESSIVE LOADS

BACKGROUND OF THE INVENTION

The invention relates to apparatus for the measurement of compressive loads, and particularly, though not exclusively, for measuring the "diametral load to close" of a gapped piston ring or sealing ring.

One type of piston ring or sealing ring for which the apparatus may be used is a ring which has a small gap so that, in its free state, it has a larger diameter than that of the cylinder with which the piston to which it is fitted in use co-operates. In use, it is fitted onto the piston and then compressed (so as at least partially to close its gap) to enable it to be fitted into the co-operating cylinder. As is known in the art, the "diametral load to close", as applied to such a ring, is the compressive load which must be applied to the ring, at points respectively located at opposite ends of a diameter of the ring which is substantially at right angles to the diameter of the ring passing through the gap, in order to close the gap to the same dimension which it will have when the ring is fitted in the co-operating cylinder.

For quality control purposes, it is desirable to know the diametral load to close of such a ring.

Hitherto, there has been no standard method or apparatus for measuring the diametral load to close of such a ring, though measuring the diametral load to close of such a ring, though various forms of apparatus have been proposed. In one such form, the ring is vertically mounted near a beam which is pivoted at a point adjacent to the ring. At a point spaced from its pivot, the beam rests on the ring at one end of a diameter thereof which is substantially at right angles to the diameter through the ring gap. Outwardly of this point of contact, the beam carries a tray for receiving weights. Initially, the beam is balanced about its pivot point so that it applies zero load to the ring. Weights are then placed in the tray until the ring gap closes to the appropriate dimension, and the diametral load to close is therefore measured by the weights in the tray.

Such apparatus is cumbersome in use and sensitive to extraneous influence.

An object of the invention is to provide improved apparatus for the measurement of compressive loads.

A more specific object of the invention is to provide improved apparatus for measuring the diametral load to close of a piston ring or the like.

BRIEF SUMMARY OF THE INVENTION

According to the invention, there is provided apparatus for the measurement of compressive loads applied to an object, comprising a frame, first and second support means respectively mounted on the frame so as to be movable relatively towards and away from each other, the support means being adapted to contact, locate and hold the said object between them, means for moving the support menas relatively towards each other to apply a compressive load to the said object, reaction means opposing movement of one of the support means in a direction away from the other support means in response to the resistance of the object to the compressive load, and measurement means responsive to the reaction means for measuring the force applied thereto and thus the compressive load applied to the said object.

BRIEF DESCRIPTION OF THE DRAWINGS

Apparatus embodying the invention for measuring the diametral load applied to a piston ring will now be described by way of example only and with reference to the accompanying drawings in which.

DESCRIPTION OF PREFERRED EMBODIMENTS

Figure 1:
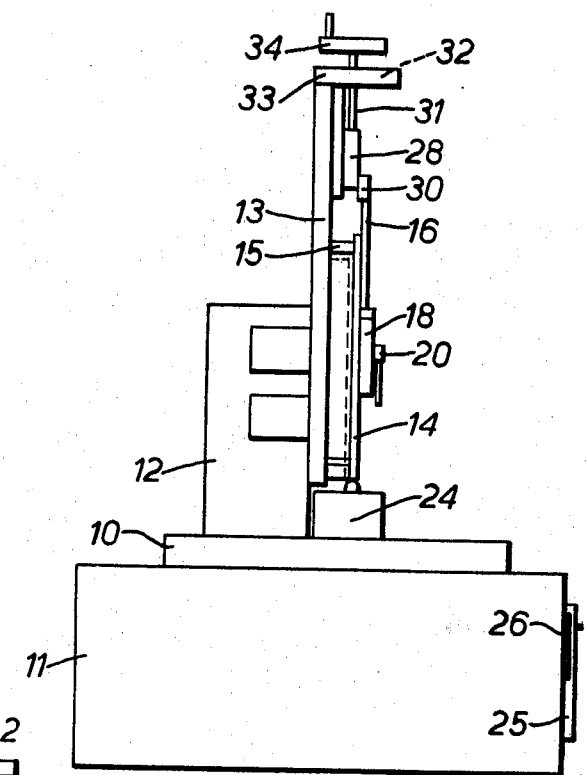
FIG. 1 is a side elevation of the apparatus.
Figure 2:
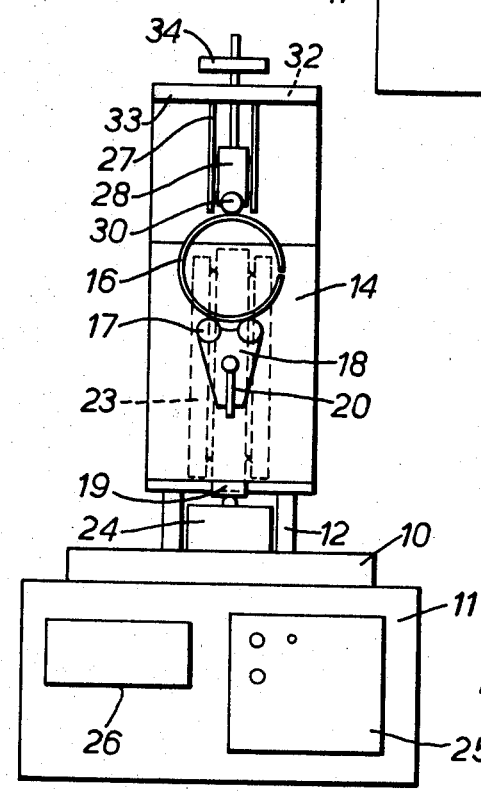
FIG. 2 is a front elevation of the apparatus.
Figure 3:
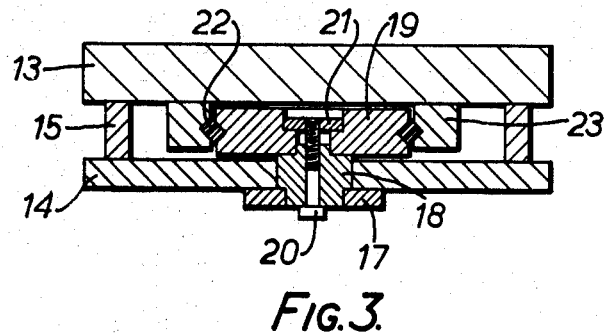
FIG. 3 is a cross-section on the line III—III of FIG. 4.
Figure 4:
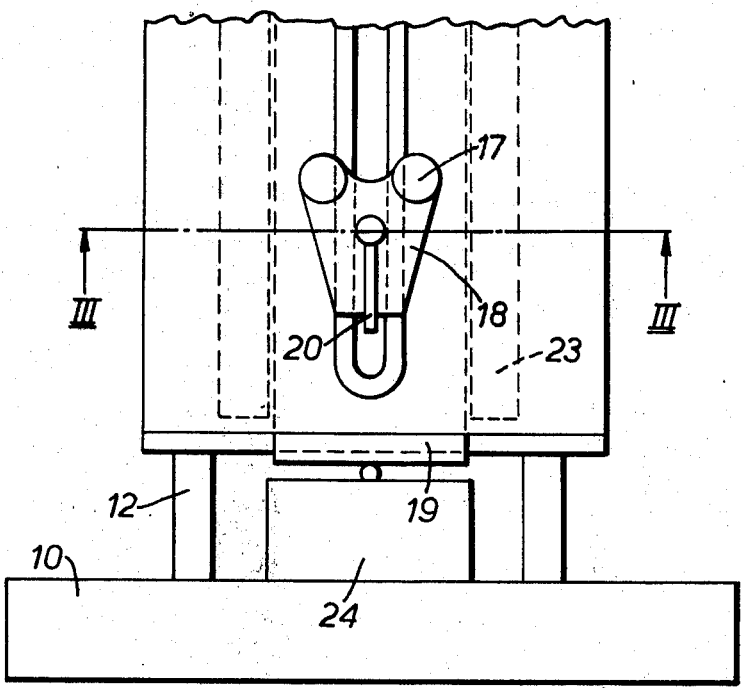
FIG. 4 is a front elevation of part of the apparatus, to a larger scale than that of FIG. 2.

Referring to the drawings, a baseplate 10 is mounted on a cabinet 11 which contains electronic apparatus to be described below. A member 12 is fixed to the baseplate 10 and supports a vertical main plate 13. The latter supports a backplate 14 through spacers 15. The piston ring 16 under test rests against the backplate 14 and is supported by two closely spaced rollers 17 mounted on a slide 18 which is movable vertically relative to a plate 19 but can be locked relative to plate 19 by means of a screw-threaded member having a handle 20 which engages with a nut 21.

The plate 19 is mounted by anti-friction bearings 22 in a slideway 23, so that the plate 19 carrying the slide 18 and rollers 17 can move vertically relative to the slideway 23 with the minimum of friction. The plate 19 rests on a load cell 24 attached to the baseplate 10. The load cell is connected to measuring circuitry 25 which in turn is connected to a display unit 26, such as a digital meter. The arrangement is such that the load applied through plate 19 to the load cell 24 is displayed on the digital meter 26. The movement of the operative button on the load cell 24, and therefore of the plate 19, can be of the order of 76 micrometers at full load. The load cell 24, the measuring circuitry 25 and the display device 26 can be of any suitable form as will be apparent to those skilled in the art. For example, the load cell 24 and the measuring circuit 25 can be of the form obtainable from the British Company Transducers C.E.L. Limited, and the display device 26 can be a digital panel meter of the type obtainable from Newport Lab. Inc.

The main plate 13 is formed at a suitable height with a slideway 27 in which a slide 28 is mounted on anti-friction bearings, similar to those of slide 19 and slideway 23. The slide 28 carries at its lower end a roller 30, coplanar with rollers 17. A shaft 31 connected to the slide 28 has a screw-threaded part engaging in a threaded hole 32 in a plate 33 fixed at the top of—and at right angles to—main plate 13, and above plate 33 the shaft has a wheel or handle 34.

The ring 16 of which the diametral load is to be measured is mounted to rest on the closely spaced rollers 17, and the slide 28 is lowered until the roller 30 has line or point contact with the ring 16. In this condition, with no load applied, the electronic apparatus may be adjusted to give zero readout. The ring is mounted so that the gap is on the horizontal diameter; this may readily be done by eye to an accuracy of ±10°, and it is found that no significant error is introduced if the gap is at 10° to the horizontal.

The diametral load is then applied to the ring 16 by rotation of the handle 34, the screw-thread engagement with plate 33 causing the slide 28 to move down relative to the slideway 27. The diametral load to be measured is that necessary to compress the piston ring 16 until the dimension of the gap between the two free ends of the ring is the same as when fitted in an engine. The load is transmitted through rollers 17, slide 18, and plate 19 to the load cell 24 which provides a direct read-out on the digital meter 26.

It will be appreciated that the apparatus may be used or adapted for purposes other than measuring the diametral load of piston rings, for example it can be used for the calibration of springs. Moreover, variations within the scope of the claims may be made.

What is claimed is:

1. Apparatus for measuring the diametral load to close of a piston ring, comprising
    a frame,
    a first slideway mounted on the frame and defining a predetermined direction of sliding,
    anti-friction bearing means on the first slideway,
    a first slide mounted on the anti-friction bearing means of the first slideway,
    load cell means mounted on the frame,
    means to transmit the load on said first slide to the load cell means,
    a second slideway mounted on the frame and defining a direction of sliding parallel to the said predetermined direction,
    a second slide mounted in said second slideway,
    mounting means carried by said first and second slides for contacting, locating and holding positions on the piston ring which are substantially opposed to each other at opposite ends of a diameter of the ring which is perpendicular to the diameter passing through the gap of the ring,
    means to apply a compressive load to the two positions on the piston ring through the second slide so as to tend to close the gap of the ring, and
    means connected to the load cell to provide a measurement of the compressive load applied to the piston ring.

2. Apparatus according to claim 1, in which the mounting means comprises a first roller mounted on one of the slides and second and third slightly spaced rollers mounted on the other slide whereby to provide 3-point location of the piston ring, the rollers being rotatable about axes parallel to the axis through the center of the ring.

3. Apparatus according to claim 2 in which the second and third slightly spaced rollers are mounted on the said other slide by means of two parts which are movable relative to each other in directions towards and away from the first roller and including clamping means for clamping the two parts to each other in any one of a range of positions.

4. Apparatus according to claim 1, in which the means to apply the compressive load comprises means in screw-threaded engagement with the frame and connected to move the second slide towards the first slide.

* * * * *